United States Patent [19]

Fujimaki et al.

[11] 4,383,085

[45] May 10, 1983

[54] RUBBER COMPOSITION FOR TIRE

[75] Inventors: Tatsuo Fujimaki, Kodaira; Shinsuke Yamaguchi, Mizuho; Tomoharu Yamada; Seisuke Tomita, both of Higashimurayama, all of Japan

[73] Assignee: Bridgestone Tire Co., Ltd., Tokyo, Japan

[21] Appl. No.: 302,938

[22] Filed: Sep. 16, 1981

[30] Foreign Application Priority Data

Sep. 20, 1980 [JP] Japan ................................ 55-130076

[51] Int. Cl.³ ........................ C08F 8/42; C08L 7/00; C08L 9/06; C08L 47/00
[52] U.S. Cl. ................................. 525/196; 525/237; 525/192
[58] Field of Search ................. 260/5, 42.22; 525/201, 525/196, 232, 237, 209, 192

[56] References Cited

U.S. PATENT DOCUMENTS

| | | | |
|---|---|---|---|
| 4,192,366 | 3/1980 | Scriver, Jr. et al. | 260/5 |
| 4,220,564 | 9/1980 | Tanimoto et al. | 525/237 |
| 4,224,197 | 9/1980 | Ueda et al. | 525/241 |
| 4,309,318 | 1/1982 | Ahagon et al. | 260/5 |
| 4,334,567 | 6/1982 | Bond | 152/209 R |
| 4,350,621 | 9/1982 | Bond et al. | 525/237 |

FOREIGN PATENT DOCUMENTS

| | | | |
|---|---|---|---|
| 46-37418 | 11/1971 | Japan | 525/237 |
| 1504734 | 3/1978 | United Kingdom | 525/237 |

*Primary Examiner*—Allan Lieberman
*Attorney, Agent, or Firm*—Sughrue, Mion, Zinn, Macpeak and Seas

[57] ABSTRACT

A rubber composition for tire having low rolling resistance and high wet skid resistance, breakage strength and wear resistance consists mainly of a rubber component containing at least 20 parts by weight of a high vinyl butadiene-styrene copolymer rubber obtained by copolymerizing randomly styrene with 1,3-butadiene, and containing 3–30% by weight of bonded styrene and 60–95% by weight of 1,2-bond in butadiene unit, and further containing metal-butadienyl bonds in its main chain in a weight fraction of at least 20% by weight.

4 Claims, No Drawings

RUBBER COMPOSITION FOR TIRE

BACKGROUND OF THE INVENTION (1) Field of the Invention:

The present invention relates to a rubber composition suitable for a pneumatic tire which can concurrently satisfy criteria for rolling resistance, wet skid resistance, breakage resistance and wear resistance.

(2) Description of the Prior Art:

Recently, resource saving and energy saving have been socially demanded and investigations for developing so-called low fuel consumption tires have been carried out in order that the power loss is reduced.

It has been generally known that an automobile provided with a tire having a low rolling resistance is more efficient in the gasoline consumption, and the tire is accordingly called a so-called low fuel-consumption tire. In order to lower the rolling resistance, materials having a low glass transition temperature, such as cis-polybutadiene rubber and the like, or materials having a low hysteresis loss, such as natural rubber and the like, as a tread rubber are generally used.

However, these rubbers are extremely low in running stability, such as braking performance on wet road and wet driving performance, and it has been very difficult to concurrently satisfy the requirements for running stability on wet road and lowering the rolling resistance.

Recently, as described in Japanese Patent Laid-open Application No. 62,248/79, improvements in the rolling resistance and running stability are attained by using only styrene-butadiene copolymer (SBR) having styrene content of 20-40% by weight and 1,2-bond content in the bonded butadiene of 50-80% by weight. But all of the polymer consists of said SBR, so that satisfactory results have not been always obtained.

Thus, since all the polymer consists of said SBR, running stability is improved than the prior SBR but rolling resistance is not yet satisfactory. Moreover, in this prior art, conventional solution polymerization-type SBR obtained by using organolithium compound is used. Therefore, a rubber composition containing the SBR is poor in breakage strength and in elongation at break. Hence, there are various problems in running of the tire or in the production thereof. The former problem is the formation of cuts and cracks on the tread surface during running of the tire on a nonpaved road, and the latter problem is the breakage of the tread caused by the mold when a vulcanized tire is taken out from the mold, that is, so-called tread scratch formed by the mold. Furthermore, the above described SBR has a glass transition temperature higher than that of conventional SBR, and therefore the rubber composition containing the above described SBR is apt to be hardened. The tire tread often fails due to the low-temperature brittleness.

Accordingly, attaining a rubber composition concurrently satisfying both the rolling resistance and running stability while maintaining excellent breakage and wear resistances remains an unsolved problem.

The inventors have diligently studied a solution to the above described drawbacks. As described in U.S. Patent Application Ser. No. 231,529, the deformation at the friction surface of the tread occurs at high speed, and the hysteresis loss in the deformation at high speed has a great influence on the friction force, that is, the running stability of the tire. The deformation of the tread owing to ground contact, which has a great influence on rolling resistance of the tire, corresponds to the rotation speed of the tire, so that the hysteresis loss at deformations of less than 100 Hz has a great influence on rolling resistance. According to the temperature-time deducibility by Williams, Landel and Ferry, it is supposed that the hysteresis loss at high speed controlling running stability conforms to the hysteresis loss measured at a lower temperature than the temperature at which the tire is used. Hence, the inventors have studied the condition under which the hysteresis loss is increased in order to improve the running stability. They found that when the hysteresis loss measured at about 0° C. in the dynamic measurement of 1.5 Hz is larger and the hysteresis loss at 50°–70° C. is smaller, rubber compositions wherein both running stability and low rolling resistance are concurrently improved, can be obtained.

Based on the above described discovery, the inventors have disclosed in U.S. Patent Application Ser. No. 231,529 that high vinyl SBR having a 1,2-bond content in butadiene unit of not less than 60% by weight can somewhat improve concurrently low rolling resistance and running stability. However, since such high vinyl SBR is insufficient in breakage resistance and wear resistance, the high vinyl SBR must be blended with other diene rubber. Moreover, unless a large amount of other diene rubber is blended, the resulting rubber can not be practically used. Consequently, when high vinyl SBR is used, the resulting rubber composition is satisfactory in the rolling resistance, but is poor in running stability.

The inventors have further disclosed in U.S. Patent Application Ser. No. 251,843 that a rubber composition consisting mainly of an amorphous gradient high vinyl butadiene-styrene copolymer rubber having an average content of 1,2-bond in butadiene unit being not less than 60% by weight, in which copolymer the 1,2-bond content uniformly varies along the molecular chain of the copolymer, can improve running stability and low rolling resistance of a tire while maintaining breakage strength of the tire.

However, running stability of a tire on wet road surface in a highway is an important property of the tire in view of safety running, and the development of low fuel consumption tires having high performance has been required from the view point of resource saving. With these problems in mind, the inventors have made various investigations with respect to styrene-butadiene copolymer rubber in order to further improve the breakage strength, low rolling resistance and running stability of tire. They have ascertained that the above described various properties can be improved by the use of a specifically limited rubber composition consisting mainly of a rubber containing at least 20 parts by weight, based on 100 parts by weight of the rubber, of a specifically limited high vinyl butadiene-styrene copolymer rubber, and accomplished the present invention.

SUMMARY OF THE INVENTION

The feature of the present invention is the provision of a rubber composition having remarkably improved wet skid resistance, low rolling resistance and breakage resistance, which consists mainly of a rubber component containing at least 20 parts by weight, based on 100 parts by weight of the rubber component, of a high vinyl butadiene-styrene copolymer rubber obtained by copolymerizing randomly styrene and 1,3-butadiene, and containing 3–30% by weight of bonded styrene and 60–95% by weight of 1,2-bond in butadiene unit, and further containing bonds of at least one metal selected from silicon, germanium, tin and lead with butadienyl group in its main chain in a weight fraction of at least 20% by weight.

DETAILED DESCRIPTION OF THE PREFERRED EMBODIMENT

The high vinyl butadiene-styrene copolymer rubber to be used in the present invention contains 3–30% by weight of bonded styrene and 60–95% by weight of 1,2-bond in butadiene unit. When the amount of the bonded styrene is less than 3% by weight, the resulting copolymer rubber is not substantially different from the high vinyl BR and the improvement in breakage and wear resistances due to introduction of the styrene group cannot be expected. Also, when said amount exceeds 30% by weight, hysteresis loss at about 0° C. becomes larger and running stability is improved but hysteresis loss at 50°–70° C. also becomes concurrently larger, so that rolling resistance is noticeably increased. When an amount of 1,2-bond is less than 60% by weight, running stability is not substantially improved, while when the amount is more than 95% by weight, the glass transition temperature becomes high and low temperature brittleness is noticeably decreased. Therefore, the amount of bonded 1,2-bond of less than 60% by weight or more than 95% by weight is not preferable.

When it is intended to improve wet skid resistance and low rolling resistance while maintaining excellent breakage resistance and wear resistance, it is preferable to blend high vinyl butadiene-styrene copolymer rubber with natural rubber or synthetic polyisoprene rubber having a self-reinforcing property due to the crystallinity in the stretched state. But when it is intended to improve the low rolling resistance while maintaining the excellent wear resistance and wet skid resistance, it is preferable to blend the high vinyl butadiene-styrene copolymer rubber with ordinary styrene-butadiene copolymer rubber having excellent wear resistance and wet skid resistance. As described later, the high vinyl butadiene-styrene copolymer rubber is completely compatible with natural rubber, and the resulting rubber blend has a united Tg. Therefore, in order to obtain a rubber composition having a large tan δ at 0° C. as an index of wet skid resistance, the high vinyl butadiene-styrene copolymer rubber is perferably has a Tg within the range of from −50° C. to 0° C. In the high vinyl butadiene-styrene copolymer rubbers having such a Tg range, high vinyl butadiene-styrene copolymer rubbers containing 3–10% by weight of bonded styrene and from more than 80% by weight to 95% by weight of 1,2-bond in the butadiene unit or containing 15–30% by weight of bonded styrene and 60–75% by weight of 1,2-bond in the butadiene unit are preferable.

In the present invention, as rubbers to be blended with the high vinyl butadiene-styrene copolymer rubber, use may be made of diene rubber having a glass transition temperature Tg of not higher than −50° C. This is based on the following reason. Even though the high vinyl butadiene-styrene copolymer rubber is higher in Tg than other usual rubbers, Tg is raised owing to 1,2-bond, so that such copolymer rubber has the specific property that the heat generation is low. Therefore, rubbers capable of being blended with the copolymer rubber without deteriorating this property must be ones having a Tg of not higher than −50° C. That is, rubbers having a Tg of not higher than −50° C. show the maximum value of mechanical loss (tan δ) at the temperature range of not higher than −35° C., so that even if these rubbers are blended with the high vinyl butadiene-styrene copolymer rubber, the tan δ values at about 0° C. and 50°–70° C. are not substantially influenced.

When polybutadiene rubber, ordinary styrene-butadiene copolymer rubber or ethylene-propylene-diene ternary copolymer rubber among diene rubbers is blended, these rubbers have no compatibility with the high vinyl butadiene-styrene copolymer rubber. Hence, the glass transition temperatures of the polymers are not united, and therefore the blended amount can be freely varied depending upon the object and use. The amount of these rubbers blended is 20–80 parts by weight in 100 parts by weight of the blend rubber. In particular, when blend rubber is used for a tire tread running on a bad road, the amount is 40–80 parts by weight. In a tire tread and side wall for a good road in which running stability, weather resistance and heat aging resistance are important, the blended amount is preferred to be about 20–60 parts by weight.

The above described ordinary styrene-butadiene copolymer rubber is commercially available SBR having a Tg of not higher than −50° C., and includes emulsion-polymerized SBRs, such SBR 1500, SBR 1712 and the like, and solution-polymerized SBRs, such as Solprene 1204, Solprene 1205 and the like.

When natural rubber and/or synthetic polyisoprene rubber among diene rubbers is blended, these rubbers are compatible with high vinyl butadiene-styrene copolymer rubber in any ratio and the glass transition temperatures are united and a glass transition temperature averaged following to the volume percentage of these polymers is obtained. Therefore, when the amount of natural rubber and/or synthetic polyisoprene rubber blended is 20–80 parts by weight in 100 parts by weight of the blend rubber, it is possible to make tan δ at about 0° C. larger and tan δ at 50°–60° C. smaller. Further, the use of a rubber blend of 40–80 parts by weight of the high vinyl butadiene-styrene copolymer rubber with 20–60 parts by weight of natural rubber and/or synthetic polyisoprene rubber is more advantageous for making tan δ at about 0° C. larger and tan δ at 50°–60° C. smaller.

Particularly, when it is intended to improve concurrently low fuel consumption, wear resistance, wet skid resistance and breakage strength, preferably used is a rubber blend consisting of 20–70 parts by weight of the high vinyl butadiene-styrene copolymer rubber, 10–30 parts by weight of ordinary styrene-butadiene copolymer rubber and 20–50 parts by weight of natural rubber and/or synthetic polyisoprene rubber. Because, when the amount of ordinary styrene-butadiene copolymer rubber exceeds 30 parts by weight, the resulting rubber composition does not have a satisfactorily low rolling resistance. When the amount thereof is less than 10 parts by weight, the resulting rubber composition is poor in wet skid resistance and in wear resistance. When the amount of natural rubber and/or synthetic polyisoprene rubber exceeds 50 parts by weight, the resulting rubber composition is satisfactorily low in rolling resistance, but is poor in wet skid resistance. When the amount thereof is less than 20 parts by weight, the resulting rubber composition is poor in breakage strength and high in rolling resistance.

Further, the present invention must satisfy the following requirement. That is, the high vinyl butadiene-styrene copolymer contains bonds of at least one metal selected from silicon, germanium, tin and lead with a butadienyl group in its main chain in a weight fraction of at least 20% by weight, preferably at least 40% by weight. Among the metals of silicon, germanium, tin and lead, tin is most effective for improving concurrently wet skid resistance and low rolling resistance.

The bonds of metal with butadienyl group in the main chain can be obtained by copolymerizing 1,3-butadiene with styrene in the presence of an organolithium compound, adding a small amount of 1,3 butadiene to the reaction mass and then carrying out a coupling reaction with the resulting copolymer with metal halide. It is a surprising phenomenon that a rubber composition containing the copolymer having such bonds has remarkably improved resistance against heat generation, and further remarkably improved breakage strength, particularly breakage strength at high temperature.

When the bonds of metal with butadienyl group are introduced into copolymers, the molecular chains of the copolymers are mutually bonded to form a so-called star-shaped polymer. The star-shaped polymer is more stable than a sulfur-crosslinked polymer formed by vulcanization commonly carried out in the rubber industry, and resists chemical changes, such as breakage, recombination and the like, even at high temperature. Therefore, the molecular weight of the copolymer between crosslinked points is determined depending only on the molecular weight distribution just before the coupling reaction. The crosslink functionality of the copolymer is determined depending upon the functionality of metal halide, and hence regular crosslinked points can be introduced into the copolymers.

Accordingly, in a rubber composition not containing such star-shaped polymer, all the crosslinked points are irregular ones formed by sulfur, and therefore the molecular weight between crosslinked points distributes in a wide range. However, in a rubber composition containing the star-shaped polymer, the proportion of molecular weight between the specifically limited crosslinked points is relatively large. This fact is one of the reasons for improving the breakage resistance. That is, when an external force is applied to a rubber composition not containing star-shaped polymer, the molecular chain having a low molecular weight between crosslinked points is strained, and stress is concentrated to such strained molecular chain. The strained molecular chain is selectively broken to lower the breakage strength of the rubber composition. On the contrary, in a rubber composition containing star-shaped polymer, such a phenomenon seldom occurs and the breakage strength can be improved. This is one of the reasons for improving the breakage strength even at high temperature, at which the reinforcing property of carbon black is deteriorated and the crosslinked points by sulfur become unstable.

In general, when strain is applied to a rubber composition, both the enthalpy-type stress due to the reinforcing property of carbon black and the entropy-type stress due to crosslinked points are generated, and the latter is a stress-generating mechanism which is generally called as rubber elasticity, and is not essentially accompanied with energy loss.

Accordingly, in order to improve resistance against heat generation, that is, low rolling resistance of rubber composition, it is necessary to approach the elasticity of rubber to be used in the rubber composition to ideal rubber elasticity as possible. The ideal rubber elasticity can be obtained by making the molecular weight between crosslinked points and the crosslink functionality uniform respectively, and by decreasing the number of free terminal chains (terminals of molecular chain having no crosslinked point). Such crosslinking structure can be obtained by introducing bonds of metal with butadienyl group into the main chain of styrene-butadiene copolymer.

The remarkable effect for improving the breakage strength and low rolling resistance varies depending upon the amount of sulfur contained in a rubber composition and the initial molecular weight of copolymer. However, in the high vinyl butadiene-styrene copolymer rubber to be used in the present invention, when the copolymer rubber contains bonds of metal with butadienyl group in its main chain in a weight fraction of at least 20% by weight, preferably at least 40% by weight, a rubber composition having remarkably high breakage strength and remarkably low rolling resistance can be obtained.

Further, the use of a gradient high vinyl butadiene-styrene copolymer rubber disclosed in the above mentioned U.S. Patent Application Ser. No. 251,843, which contains 3–30% by weight of bonded styrene and has an average content of 1,2-bond in butadiene unit being not less than 60% by weight, in which copolymer the 1,2-bond content uniformly varies along the molecular chain of the copolymer, is more effective for improving the performance of rubber composition.

The diene rubbers having a Tg of not higher than −50° C., to be used in the present invention include natural rubber, synthetic polyisoprene rubber, ethylene-propylene-diene ternary copolymer rubber and polybutadiene rubber and styrene-butadiene copolymer rubber containing not more than 50% by weight of 1,2-bond in butadiene unit. At least one of these diene rubbers is blended with the high vinyl butadiene-styrene copolymer rubber and used.

In the present invention, it is preferable to incorporate 1–40 parts by weight of a softening agent and 5–70 parts by weight of carbon black based on 100 parts by weight of the rubber component. When the softening agent exceeds 40 parts by weight and carbon black exceeds 70 parts by weight, the heat generation of the rubber composition becomes higher and the rolling resistance is increased and such amounts are not preferable.

In the rubber compositions of the present invention, compounding agents used in the usual rubber industry, such as a vulcanizing agent, accelerating agent, promoter assistant, antioxidant and the like may be incorporated.

The rubber compositions of the present invention achieve remarkable excellence in wear resistance and breakage resistance and have noticeably improved running stability.

The following examples are given for the purpose of illustration of this invention and are not intended as limitations thereof.

EXAMPLE 1

Various butadiene-styrene copolymers shown in the following Table 1 were used in the production of rubber compositions. Copolymers A-N were produced by using n-butyllichium as a catalyst. Copolymers A and C-M were produced under a temperature-raising adiabatic atmosphere, and copolymers B and N were produced under a constant temperature atmosphere. Butadienyl-tin bonds were introduced into the main chain of copolymers A-L and N by the coupling of $SnCl_4$ to the copolymers. Copolymer P is SBR 1500. Styrene content in the copolymer was measured by the gas chromatography, the content of 1,2-bond in butadiene unit was measured by an infrared spectrometer, and the tan δ was masured by means of a mechanical spectrometer (amplitude of dynamic shear strain: 0.5%) made by Rheometrics Corp. The weight fraction of molecular chain containing butadienyl-metal bond was measured by means of the gel-permeation chromatography.

Various rubber compositions were produced by using copolymers A-N according to the compounding recipe shown in the following Table 2. The tan δ and breakage strength of the resulting rubber compositions were measured. Further, tires having a size of 165 SR 13 were produced by using the rubber compositions in their tread, and the tires were evaluated with respect to the wear resistance, rolling resistance, braking performance on wet road and resistance against nonpaved road.

The obtained results are shown in the following Table 3. The evaluation methods are as follows.

Breakage strength:

The breakage strength was measured according to JIS K6301.

Wear resistance:

After a test tire was run on road by a distance of 10,000 km, the depth of the remaining groove was measured, and the running distance of the tire required for wearing 1 mm of its tread was calculated and compared with the standard running distance. Index 100 corresponds to the standard running distance. The larger the index of a rubber composition, the higher the rubber composition is in wear resistance.

Rolling resistance:

A test tire subjected to an internal pressure of 1.7 kg/cm$^2$ was trained on a steel drum with a diameter of 1,707.6 mm and a width of 350 mm, which was rotated by the driving of a motor, at a speed of 80 km/hr under a JIS 100% load (385 kg) for 30 minutes and thereafter the rotating speed of the drum was raised to 100 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. The rolling resistance of the test tire was evaluated by the following formula:

$$\frac{\text{(Rolling resistance value of test tire)}}{5.2 \text{ kg}} \times 100$$

Index 100 corresponds to the rolling resistance of 5.2 kg. The smaller is the index, the more excellent the rolling resistance of the tire is.

Braking performance on wet road:

A test tire was suddenly braked during the running at a speed of 80 km/hr on a wet concrete road covered with water in a depth of 3 mm, and the running distance of the tire after the tire was locked was measured. The braking performance on wet road of the test tire was evaluated by following formula:

$$\frac{\text{(Running distance of test tire)}}{40 \text{ m}} \times 100$$

Index 100 corresponds to 40 m, and the smaller is the index, the more excellent the tire is in the braking performance on wet road.

Resistance against nonpaved road:

After a test tire was run on a nonpaved road in a distance of 5,000 km, 70% of which was occupied by a surface consisting mainly of gravel, the tire was taken off from the car, and formation of crack and cut on the tread surface was observed.

TABLE 1

| Copolymer | A | B | C | D | E | F | G | H | I | J | K | L | M | N | P |
|---|---|---|---|---|---|---|---|---|---|---|---|---|---|---|---|
| Styrene content (wt. %) | 30 | 30 | 30 | 20 | 20 | 5 | 5 | 3 | 10 | 15 | 40 | 30 | 30 | 0 | 23.5 |
| Content of 1,2-bond in butadiene unit (wt. %) | 65 | 65 | 65 | 65 | 80 | 90 | 90 | 95 | 82 | 30 | 65 | 65 | 65 | 65 | 18 |
| Weight fraction of molecular chain containing butadienyl-metal bond (wt. %) | 30 | 30 | 70 | 20 | 30 | 30 | 70 | 30 | 30 | 30 | 30 | 15 | 0 | 30 | 0 |
| Gradient distribution of 1,2-bond content | yes | no | yes | yes | yes | yes | yes | yes | yes | yes | yes | yes | yes | no | no |

TABLE 2

| | (Parts by weight) | |
|---|---|---|
| Rubber Composition No. | 1–14 and 30–35 | 15 and 16 |
| Copolymer listed in Table 1 or Table 5 | 50 | 100 |
| Natural rubber | 50 | |
| ISAF carbon black | 50 | 50 |
| Aromatic oil | 10 | 10 |
| Zinc oxide | 4 | 4 |
| Stearic acid | 2 | 2 |
| N—Oxydiethylene-2-benzothiazylsulfenamide | 0.55 | 0.55 |
| Dibenzothiazyl disulfide | 0.3 | 0.3 |
| Sulfur | 2.0 | 2.0 |
| N—Phenyl-N'—isopropyl-p-phenylenediamine | 1.0 | 1.0 |

TABLE 3

| Rubber composition No. | Present invention | | | | | | | | | Comparative rubber composition | | | | | | Present invention |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Copolymer | A | B | C | D | E | F | G | H | I | J | K | L | M | N | P | A |
| Tanδ (0° C.) | 0.597 | 0.600 | 0.582 | 0.50 | 0.580 | 0.43 | 0.42 | 0.45 | 0.51 | 0.22 | 0.650 | 0.585 | 0.610 | 0.230 | 0.3 | 0.740 |
| Tanδ (60° C.) | 0.082 | 0.090 | 0.076 | 0.087 | 0.091 | 0.075 | 0.069 | 0.076 | 0.080 | 0.181 | 0.232 | 0.155 | 0.240 | 0.110 | 0.211 | 0.120 |
| Breakage strength | 249 | 242 | 252 | 240 | 240 | 238 | 241 | 237 | 240 | 220 | 250 | 239 | 238 | 160 | 252 | 200 |

TABLE 3-continued

| Rubber composition | Present invention | | | | | | | | | Comparative rubber composition | | | | | | Present invention |
|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 |
| (kg/cm$^2$) | | | | | | | | | | | | | | | | |
| Wear resistance | 109 | 104 | 110 | 106 | 103 | 107 | 109 | 103 | 107 | 85 | 99 | 98 | 96 | 72 | 100 | 96 |
| Rolling resistance | 69 | 71 | 63 | 70 | 70 | 64 | 59 | 64 | 66 | 100 | 110 | 193 | 112 | 75 | 100 | 80 |
| Braking performance on wet road | 75 | 76 | 76 | 90 | 79 | 89 | 90 | 87 | 77 | 98 | 102 | 77 | 82 | 97 | 100 | 70 |
| Resistance against non paved road (formation of crack and cut) | none | none | none | none | none | none | none | none | none | none | none | none | none | " | none | " |

It can be seen from Table 3 that the rubber composition of the present invention is excellent in the breakage strength and wear resistance and further is remarkably excellent in the running stability and rolling resistance.

EXAMPLE 2

Various rubber compositions were produced according to the compounding recipe shown in the following Table 4, and evaluated in the same manner as described in Example 1. The obtained results are shown in Table 4.

It can be seen from Table 4 that the rubber composition of the present invention for tire is excellent in the breakage strength and wear resistance and further is remarkably excellent in the running stability and rolling resistance.

EXAMPLE 3

Rubber compositions were produced by using copolymers shown in the following Table 5 according to the compounding recipe shown in Table 2, and the resulting rubber compositions were evaluated in the same manner as described in Example 1. The obtained results are shown in Table 5.

It can be seen from Table 5 that the rubber composition of the present invention for tire is excellent in the breakage strength and wear resistance and further is remarkably excellent in the running stability and rolling resistance.

TABLE 4(a)

| | Rubber composition | Present invention | | | | | | | | | | Comparative rubber composition | | |
|---|---|---|---|---|---|---|---|---|---|---|---|---|---|---|
| | | 17 | 18 | 19 | 20 | 21 | 22 | 23 | 24 | 25 | 26 | 27 | 28 | 29 |
| Compounding recipe (parts by weight) | Copolymer A | 50 | 50 | 50 | | | | | | | | | | |
| | Copolymer D | | | | 40 | 80 | | | | | | | | |
| | Copolymer F | | | | | | 50 | 50 | 50 | 40 | 70 | | | |
| | Copolymer J | | | | | | | | | | | 50 | 50 | 50 |
| | BR01 | 20 | | | | | 20 | | | | | 20 | | |
| | IR 2200 | | 50 | | 40 | 20 | | 50 | | 35 | 30 | | 50 | |
| | SBR 1500 | 30 | | 50 | 20 | | 30 | | 50 | 25 | | 30 | | 50 |
| | ISAF carbon black | 50 | 50 | 50 | 50 | 50 | 50 | 50 | 50 | 50 | 50 | 50 | 50 | 50 |
| | Aromatic oil | 10 | 10 | 10 | 10 | 10 | 10 | 10 | 10 | 10 | 10 | 10 | 10 | 10 |
| | Zinc oxide | 4 | 4 | 4 | 4 | 4 | 4 | 4 | 4 | 4 | 4 | 4 | 4 | 4 |
| | Stearic acid | 2 | 2 | 2 | 2 | 2 | 2 | 2 | 2 | 2 | 2 | 2 | 2 | 2 |
| | N—Oxydiethylene-2-benzothiazylsulfenamide | 0.55 | 0.55 | 0.55 | 0.55 | 0.55 | 0.55 | 0.55 | 0.55 | 0.55 | 0.55 | 0.55 | 0.55 | 0.55 |
| | Dibenzothiazyl disulfide | 0.3 | 0.3 | 0.3 | 0.3 | 0.3 | 0.3 | 0.3 | 0.3 | 0.3 | 0.3 | 0.3 | 0.3 | 0.3 |
| | Sulfur | 2.0 | 2.0 | 2.0 | 2.0 | 2.0 | 2.0 | 2.0 | 2.0 | 2.0 | 2.0 | 2.0 | 2.0 | 2.0 |
| | N—Phenyl-N'—isopropyl-p-phenylenediamine | 1.0 | 1.0 | 1.0 | 1.0 | 1.0 | 1.0 | 1.0 | 1.0 | 1.0 | 1.0 | 1.0 | 1.0 | 1.0 |

TABLE 4(b)

| | Rubber composition No. | Present invention | | | | | | | | | | Comparative rubber composition | | |
|---|---|---|---|---|---|---|---|---|---|---|---|---|---|---|
| | | 17 | 18 | 19 | 20 | 21 | 22 | 23 | 24 | 25 | 26 | 27 | 28 | 29 |
| property | tanδ (0° C.) | 0.572 | 0.575 | 0.685 | 0.53 | 0.67 | 0.51 | 0.42 | 0.55 | 0.65 | 0.68 | 0.19 | 0.20 | 0.27 |
| | tanδ (60° C.) | 0.080 | 0.081 | 0.092 | 0.091 | 0.095 | 0.080 | 0.077 | 0.083 | 0.070 | 0.091 | 0.155 | 0.179 | 0.200 |
| | Breakage strength (kg/cm$^2$) | 241 | 245 | 248 | 245 | 243 | 243 | 237 | 245 | 260 | 235 | 203 | 210 | 215 |
| | Wear resistance | 105 | 103 | 105 | 105 | 103 | 105 | 105 | 106 | 108 | 101 | 92 | 89 | 91 |
| | Rolling resistance | 69 | 67 | 72 | 70 | 72 | 68 | 66 | 69 | 61 | 70 | 95 | 100 | 100 |
| | Braking performance on wet road | 79 | 77 | 74 | 79 | 66 | 83 | 90 | 79 | 68 | 65 | 93 | 96 | 100 |
| | Resistance against nonpaved road (formation of crack and cut) | none | none | none | none | none | none | none | none | none | none | " | none | none |

TABLE 5

| Rubber composition No. | Present invention | | | | | |
|---|---|---|---|---|---|---|
| | 30 | 31 | 32 | 33 | 34 | 35 |
| Styrene content | 30 | 30 | 30 | 5 | 5 | 5 |
| Content of 1,2-bond in | 65 | 65 | 66 | 90 | 90 | 90 |

TABLE 5-continued

| Rubber composition No. | Present invention | | | | | |
|---|---|---|---|---|---|---|
| | 30 | 31 | 32 | 33 | 34 | 35 |
| butadiene unit (wt. %) Weight fraction of molecular chain containing butadienyl-metal bond (wt. %) | 30 | 28 | 30 | 25 | 20 | 25 |
| Metal | silicon | germanium | lead | silicon | germanium | lead |
| tanδ (0° C.) | 0.572 | 0.569 | 0.575 | 0.46 | 0.47 | 0.48 |
| tanδ (60° C.) | 0.087 | 0.080 | 0.102 | 0.083 | 0.086 | 0.091 |
| Breakage strength (kg/cm²) | 247 | 245 | 240 | 237 | 235 | 236 |
| Wear resistance | 107 | 109 | 104 | 103 | 105 | 101 |
| Rolling resistance | 69 | 70 | 73 | 69 | 70 | 70 |
| Braking performance on wet road | 78 | 76 | 80 | 90 | 89 | 89 |
| Resistance against nonpaved road (formation of crack and cut) | none | none | none | none | none | none |

What is claimed is:

1. A rubber composition for a tire tread consisting mainly of a rubber component containing at least 20 parts by weight, based on 100 parts by weight of the rubber component, of a high vinyl butadiene-styrene copolymer rubber obtained by copolymerizing randomly styrene with 1,3-butadiene, and containing 3–30% by weight of bonded styrene and 60–95% by weight of 1,2-bond in the butadiene unit, and further containing bonds of at least one metal selected from silicon, germanium, tin and lead with butadienyl group in its main chain in a weight fraction of at least 20% by weight, wherein said rubber component is a diene rubber having a glass transition temperature not higher than −50° C.

2. A rubber composition for a tire tread according to claim 1, wherein the rubber component is a rubber blend consisting of 20–80 parts by weight of said high vinyl butadiene-styrene copolymer rubber and 80–20 parts by weight of at least one diene rubber having a glass transition temperature not higher than −50° C., which is selected from the group consisting of natural rubber, synthetic polyisoprene rubber, ethylene-propylene-diene ternary copolymer rubber, and polybutadiene rubber and styrene-butadiene copolymer rubber containing not more than 50% by weight of 1,2-bond in the butadiene unit.

3. A rubber composition for a tire tread according to claim 1, wherein said high vinyl butadiene-styrene copolymer rubber contains 3–10% by weight of bonded styrene and from more than 80% by weight to 95% by weight of 1,2-bond in the butadiene unit.

4. A rubber composition for a tire tread according to claim 1, wherein said high vinyl butadiene-styrene copolymer rubber contains 15–30% by weight of bonded styrene and 60–75% by weight of 1,2-bond in the butadiene unit.

* * * * *

UNITED STATES PATENT AND TRADEMARK OFFICE
CERTIFICATE OF CORRECTION

PATENT NO. : 4,383,085

DATED : May 10, 1983

INVENTOR(S) : Tatsuo Fujimaki, Shinsuke Yamaguchi, Tomoharu Yamada and Seisuke Tomita It is certified that error appears in the above-identified patent and that said Letters Patent is hereby corrected as shown below:

Column 12, line 4, after "wherein" insert —the remainder of—;
line 4, after "is" insert —at least one—.

Signed and Sealed this

Eleventh Day of September, 1990

Attest:

HARRY F. MANBECK, JR.

*Attesting Officer*      *Commissioner of Patents and Trademarks*